(12) United States Patent  
Andersson

(10) Patent No.: US 8,174,561 B2  
(45) Date of Patent: May 8, 2012

(54) DEVICE, METHOD AND PROGRAM FOR CREATING AND DISPLAYING COMPOSITE IMAGES GENERATED FROM IMAGES RELATED BY CAPTURE POSITION

(75) Inventor: Magnus Andersson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 677 days.

(21) Appl. No.: 12/048,462

(22) Filed: Mar. 14, 2008

(65) Prior Publication Data

US 2009/0234473 A1    Sep. 17, 2009

(51) Int. Cl.
H04N 7/00 (2011.01)
H04N 5/76 (2006.01)

(52) U.S. Cl. .............. 348/39; 348/231.2; 348/231.3; 348/231.4; 348/231.6

(58) Field of Classification Search .............. 348/36, 348/39, 218.1, 231.99, 231.2, 231.3, 231.6, 348/231.4; 382/294
See application file for complete search history.

(56) References Cited

U.S. PATENT DOCUMENTS

| | | | |
|---|---|---|---|
| 6,335,754 B1 * | 1/2002 | Endo et al. ............... | 348/37 |
| 6,654,019 B2 * | 11/2003 | Gilbert et al. ............ | 345/474 |
| 6,950,120 B1 * | 9/2005 | Endo et al. ............... | 348/36 |
| 7,423,666 B2 * | 9/2008 | Sakakibara et al. ....... | 348/136 |
| 2001/0010546 A1 * | 8/2001 | Chen ....................... | 348/218 |
| 2003/0231243 A1 | 12/2003 | Shibutani | |
| 2004/0066391 A1 | 4/2004 | Daily et al. | |
| 2004/0130626 A1 * | 7/2004 | Ouchi et al. ............. | 348/207.1 |
| 2004/0155971 A1 * | 8/2004 | Sharma et al. ............ | 348/239 |
| 2005/0104976 A1 | 5/2005 | Currans | |
| 2005/0146620 A1 | 7/2005 | Monroe et al. | |
| 2006/0182437 A1 * | 8/2006 | Williams et al. .......... | 396/429 |
| 2007/0081796 A1 * | 4/2007 | Fredlund et al. ......... | 386/125 |
| 2007/0147787 A1 * | 6/2007 | Ogawa et al. ............ | 386/107 |
| 2008/0059065 A1 | 3/2008 | Strelow et al. | |
| 2008/0062126 A1 | 3/2008 | Algreatly | |
| 2008/0062254 A1 | 3/2008 | Edwards et al. | |

FOREIGN PATENT DOCUMENTS

EP    1 003 322 A2    5/2000

OTHER PUBLICATIONS

Notification of Transmittal of the International Search Report and the Written Opinion of the International Searching Authority, or the Declaration, 19 pages.

* cited by examiner

*Primary Examiner* — Daniel M Pasiewicz
(74) *Attorney, Agent, or Firm* — Harrity & Harrity, LLP

(57) ABSTRACT

A system for presenting recorded data includes an electronic device and a database connectable to the electronic device over a communications network, the electronic device including a recording unit to record data from a first direction, a positional arrangement to determine positional data of the electronic device, a directional arrangement to determine directional data indicating the direction of the recorded data relative the position data; a memory including a first application stored thereon; and a control unit to execute the application to associate the directional data and the positional data to the recorded data and to transmit the recorded data with the associated positional and directional data to the database.

13 Claims, 8 Drawing Sheets

DEVICE, METHOD AND PROGRAM FOR CREATING AND DISPLAYING COMPOSITE IMAGES GENERATED FROM IMAGES RELATED BY CAPTURE POSITION

TECHNICAL FIELD

The invention generally relates to electronic devices and, more particularly, to electronic devices recording data.

BACKGROUND

Electronic devices, such as mobile phones, are today provided with more and more functions besides voice communications. Examples of such functions provided to an electronic device are MP3 players and cameras.

In the fast growing use of Internet multiple services, functions and features are added to increase the experience of different features on the Internet. Today, blogging, and Internet communities, generally, are fast growing phenomena with an ever increasing number of users. The opportunities, both business-related, as well as functional aspects, involving these services are significant and it is therefore commercially important to add as much as possible value to the users of different services over the Internet.

Currently, services over the Internet exist whereby a user may view an image captured from different sites/locations of the world as a user clicks on a map or similar geographic representation. The images may be taken by portable devices and sent to a server on the Internet which displays the images.

However, there is a desire to enhance the feature of displaying image data in a service, adding more value to the user of such services.

SUMMARY

Exemplary embodiments provide a possibility to enhance the presentation of recorded material. Other embodiments enhance services presenting recorded material.

Some embodiments disclose an electronic device comprising a recording unit arranged to record data in a direction, a positional arrangement configured to determine positional data of the electronic device, a directional arrangement arranged to determine directional data indicating the orientation of the electronic device, a memory comprising a first application stored thereon, and a control unit arranged to associate the directional data and the positional data to the recorded data upon execution of the first application.

Some embodiments disclose a computer comprising a memory with a third application stored thereon and a control unit arranged, upon execution of the third application, to receive recorded data with associated directional data and positional data, to compare positional data of previously stored, on the computer, recorded data with associated positional and directional data, to determine positional data of the recorded data to be similar as the positional data being within a predetermined range of each other, and to process the recorded data with the recorded data of similar positional data by stitching the recorded data and the previously stored recorded data together.

Such a computer may be a server, a database or the like.

Some embodiments disclose a system for presenting recorded data comprising an electronic device and a database connectable to the electronic device over a communications network, wherein the electronic device comprises a recording unit arranged to record data from a first direction, a positional arrangement configured to determine positional data of the electronic device, a directional arrangement arranged to determine directional data indicating the direction of the recorded data relative the position data, a memory comprising a first application stored thereon, and a control unit arranged to associate the directional data and the positional data to the recorded data and to transmit the recorded data with the associated positional and directional data to the database when the application is executed thereon; the database comprises a receiving arrangement configured to receive the recorded data, a memory a memory with a third application stored thereon and a database control unit arranged to execute the third application wherein the recorded data is presented based on the associated positional and directional data.

Some embodiments disclose a method in an electronic device for processing recorded data comprising the steps of: recording data of an area, associating positional data to the recorded data, associating directional data received from a directional unit in the electronic device indicating the direction to the recorded data, and storing the recorded data with the positional and directional data at a data storage.

Some embodiments comprise a computer program product including a computer usable medium having computer program logic stored therein to enable a control unit of an electronic device to perform the steps of: receiving recorded data, associating positional data of the electronic device to the recorded data, associating directional data received from a directional unit in the electronic device indicating the direction of the recorded data relative the positional data, and storing the recorded data with the positional and directional data at a data storage.

Some embodiments comprise a computer program product including a computer usable medium having computer program logic stored therein to enable a control unit of a electronic device to perform the steps of: receiving recorded data with associated positional and directional data, comparing the positional data with positional data of previously stored on the computer device, determining positional data of the recorded data with previously stored recorded data to be similar as the positional data being within a predetermined range of each other, and processing the recorded data with the previously stored recorded data of similar positional data by stitching the data together.

This enables enhancement of existing recording tools that provides an enhanced functionality to the electronic devices/services of today.

BRIEF DESCRIPTION OF THE DRAWINGS

Embodiments will now be described in more detail in relation to the enclosed drawings.

DETAILED DESCRIPTION OF PREFERRED EMBODIMENTS

Figure 1:
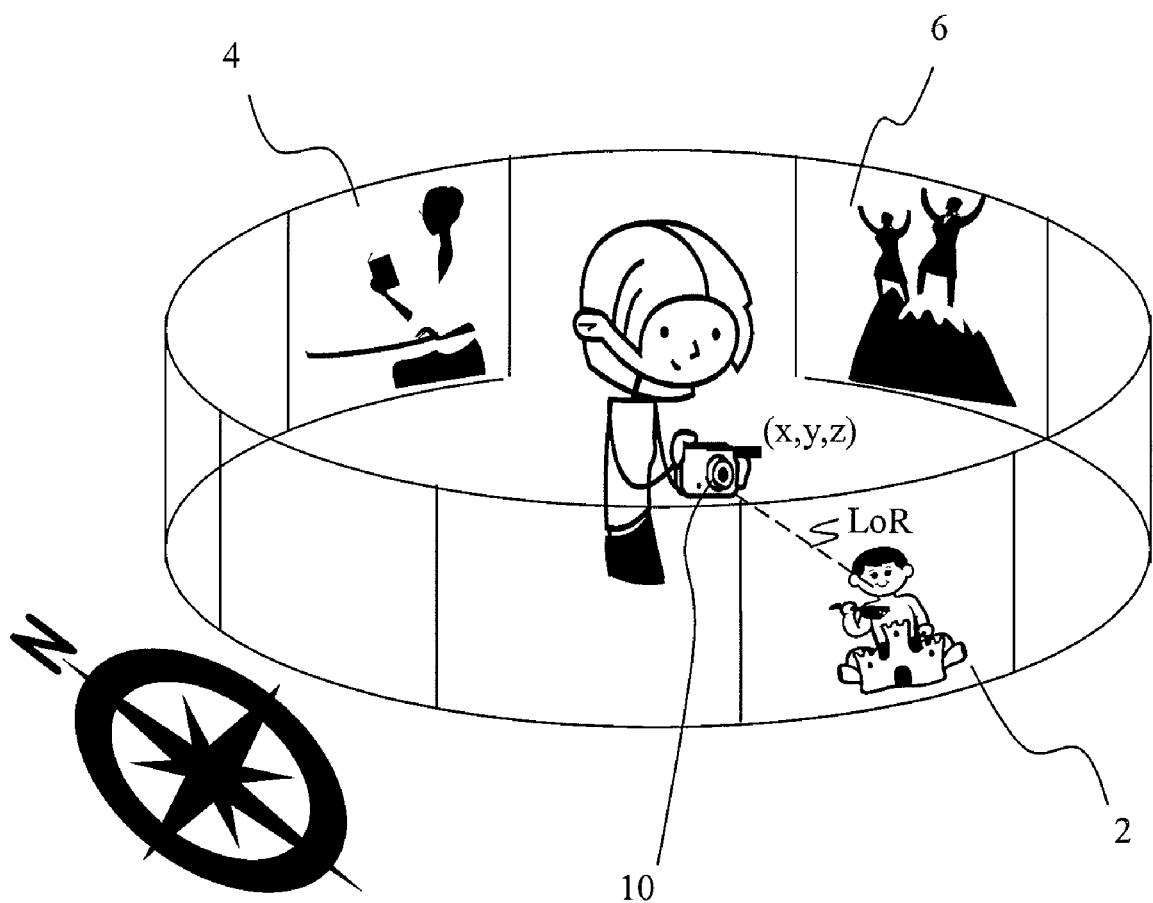
FIG. 1 shows a schematic overview of a user recording images of different directions from the same positional spot.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that the disclosure will be thorough and complete, and will fully convey the scope of the invention to those skilled in the art. Like numbers may refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention relates to handling of data in electronic devices, for the purpose of storing data, accessing data or communicating data. The electronic device as such may take the shape of e.g. a personal computer, a digital camera, a media player, or a PDA. However, as a best mode of the invention presently known, the invention will mainly be described herein as incorporated in the field of telecommunications, and the electronic device will therefore occasionally be referred to as a mobile phone. It should be noted, though, that the borders between what can be considered a mobile phone, a portable camera, a portable laptop computer, a PDA, becomes less and less clear since many electronic devices include corresponding functions, even though focus is on different functionalities in the different categories of electronic devices.

In FIG. 1, different views of an electronic device 10, for example, a mobile phone with a camera feature, based on the direction of the line of recording, LoR, of the camera lens are shown. The LoR may also be denoted as line of view LoV when recording an image or moving image. In the illustrated example, electronic device 10 is positioned at a position (x,y,z) and as electronic device 10 is aimed in different directions the LoR of the recording unit in the electronic device changes. This results in that recorded images from electronic device 10 at a certain position (x,y,z) differs depending on the direction in which electronic device 10 is directed. In the illustrated example, electronic device 10 pointed in the due north direction records a first image 4, in the due east direction records a second image 6, and in the due south direction records a third image 2.

This may be used in order to provide an added value service of a site on the Internet or the like. For example, recorded data of an electronic device with attached data indicating a direction is stored in a data storage and an application stitches together or concatenates recorded data with the same/similar positional data but with different directional data. "Similar" may be defined as positional data that differs within a predetermined range, such as a circle area with a radius of 10 m or other distance. These integrated data may then be presented/displayed to a user of the application in such a manner that the user experiences an approximate panoramic view from the position (x,y,z).

Directional data as well as positional data are applied to the recorded data. The positional (e.g., geographic location) data may include geographical coordinates or other information and may be retrieved from a GNSS-system, such as GPS, and directional data may be retrieved from an electronic compass, which detects the magnetic directions without requiring moving parts, arranged in the electronic device.

A benefit of adding a compass direction to a geographical tag of an image is that it will become more convenient to place the images together on a map and view in the full context. Hence, the tag may include both positional data of the recording device and directional data from the position towards the recorded data.

Figure 2:
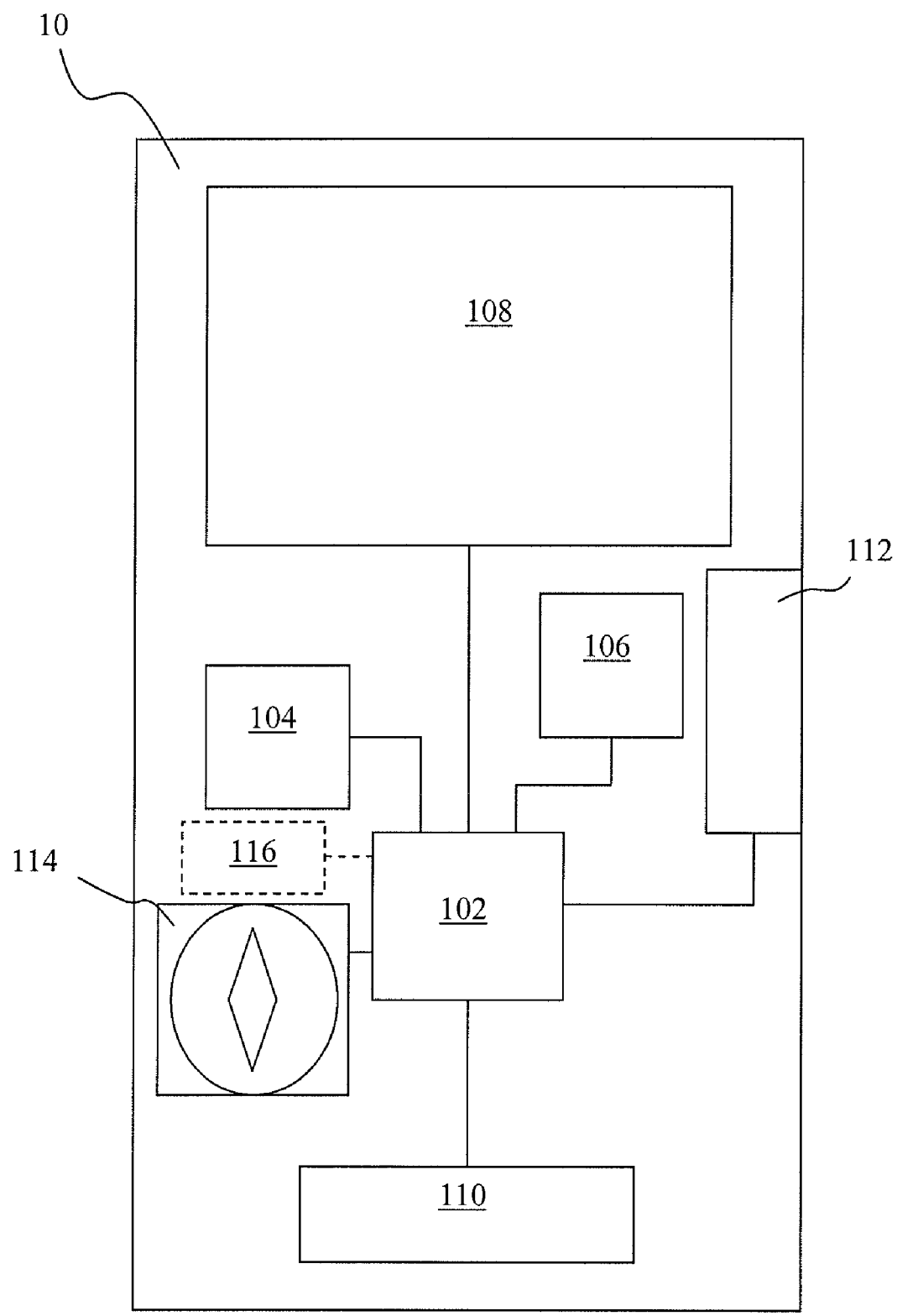
FIG. 2 shows a schematic overview of a mobile device.

In FIG. 2, electronic mobile communications device 10 is shown. Mobile device 10 comprises a housing structure including a chassis and a cover, directly or indirectly supporting the other components of the terminal. Mobile device 10 may be further devised with a user input interface 110 comprising a keypad and may also comprise a microphone (not shown). In addition, user input interface 110 may also comprise a touch-sensitive display in addition to or instead of a keypad. Furthermore, a user output interface 108 is arranged in the mobile device and may include a display unit and also a speaker (not shown). Mobile device 10 may also comprises a tranceiving unit 112 arranged to transmit and receive data. Transceiving unit 112 may include a satellite positional receiver or this may be a separate unit.

Mobile device 10 may further comprise a control unit 102, such as, a processor, CPU, FPGA, or the like, connected to memory 104 containing, for example, applications arranged to be executed on control unit 102. Mobile device 10 also includes a data recording arrangement 106 configured to record data, such as, images, audio, and/or other recordable data. The recording arrangement may be, for example, a camera, a video camera, a microphone, and/or the like. The recording arrangement comprises an input area facing a certain direction, for example, a direction of a line of view of a camera or the like.

In addition, to determine the direction of the input of the recording and, consequently, the line of recording or the like, a directional unit 114 may be arranged in mobile device 10. Directional unit 114 may be an electronic compass, a mechanical compass with a digital reader or any device to determine a direction, for example, with respect to a magnetosphere.

In an embodiment, directional unit 114 may further comprise a tilting unit, denoted as 116 in a dotted box, including a tilting function to determine the tilting or orientation of the electronic device. This tilting angle may also be included in the data tag applied to the recorded image. Tilting unit 116 may measure the tilting angle relative an original position of the electronic device, such as a position where the LoR of the recording unit is parallel to the ground or horizon. Tilting unit 116 may include tilt and/or inclinometers, such as an accelerometer, a plurality of accelerometers, gyros or the like. Tilting unit 116 may further be arranged to measure the pitch and roll of the electronic device, and this data may as well be included into the tag information.

When data is recorded in the device positional data is tagged to the recorded data received from tranceiving unit 112, as well as directional data read from directional unit 114, and optionally also tilting or orientation data, using an application stored on memory 104 and executed on control unit 102.

Figure 3:
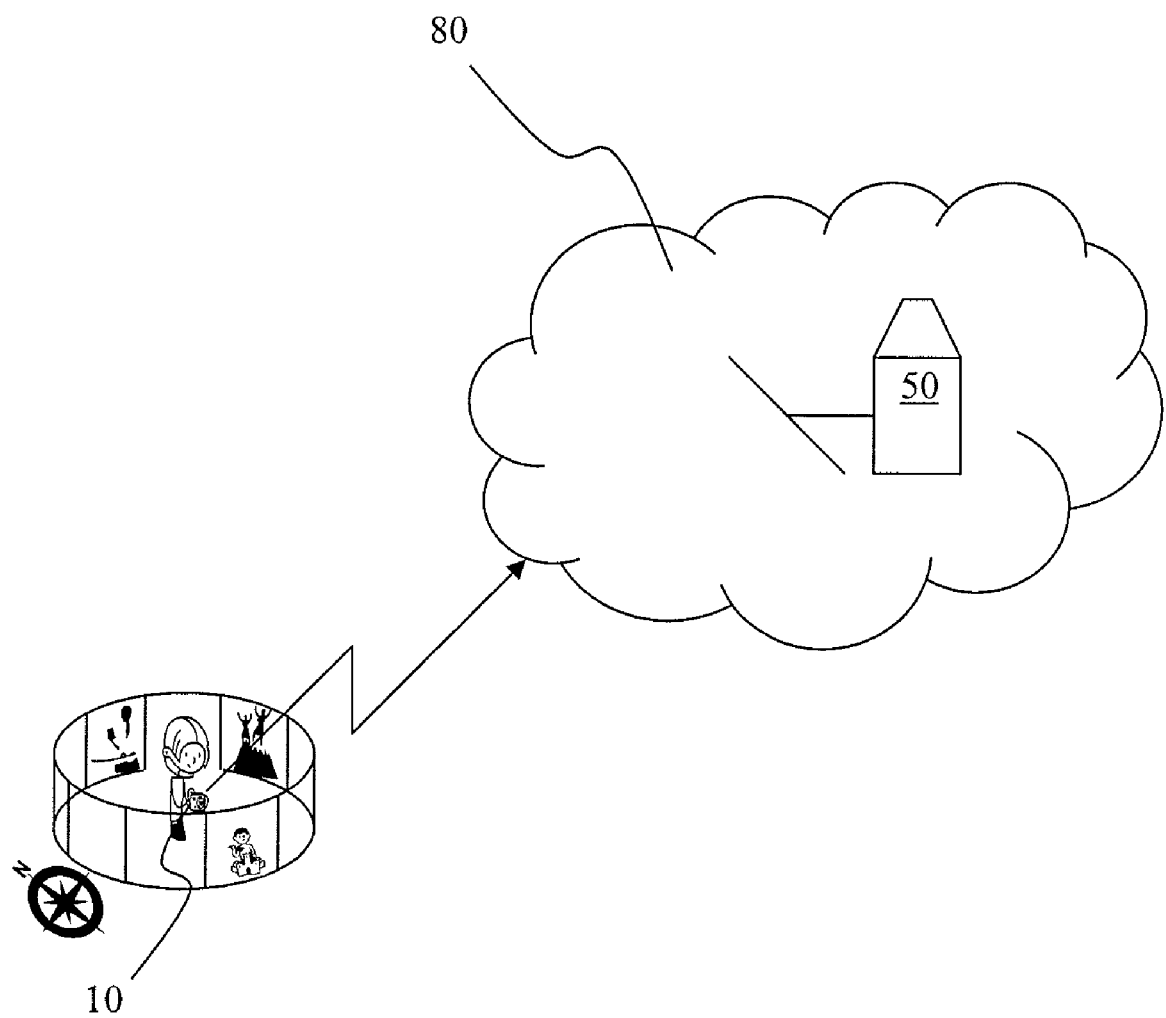
FIG. 3 shows a schematic overview of a system according to an embodiment.

In FIG. 3, a schematic overview of a system for presenting recorded data is shown. The system comprises electronic device 10 arranged to record data in selected directions. The recorded data is associated with positional data of the electronic device and directional data indicating the direction from the electronic device toward the recorded data, for example, relative to the earth's magnetic field (e.g., N, NNE, E, ESE, S, SSW, W, WNW, etc.).

The recorded data along with its associated positional and directional data may be transmitted over a network 80, such as Internet, WLAN, or the like, to a computer unit 50, such as a database, a server, or the like. In an embodiment, computer unit 50 may include an application arranged to compare the positional data of the received recorded data with other positional data of previously stored recorded data and arranging recorded data of similar positions together. The arranged recorded data may then be stitched or linked together to thereby enable the recorded data of similar positional data to be presented panoramically, in time lapse, etc. In an application running on a server a virtual reality environment may be created using said recorded data.

Figure 4:
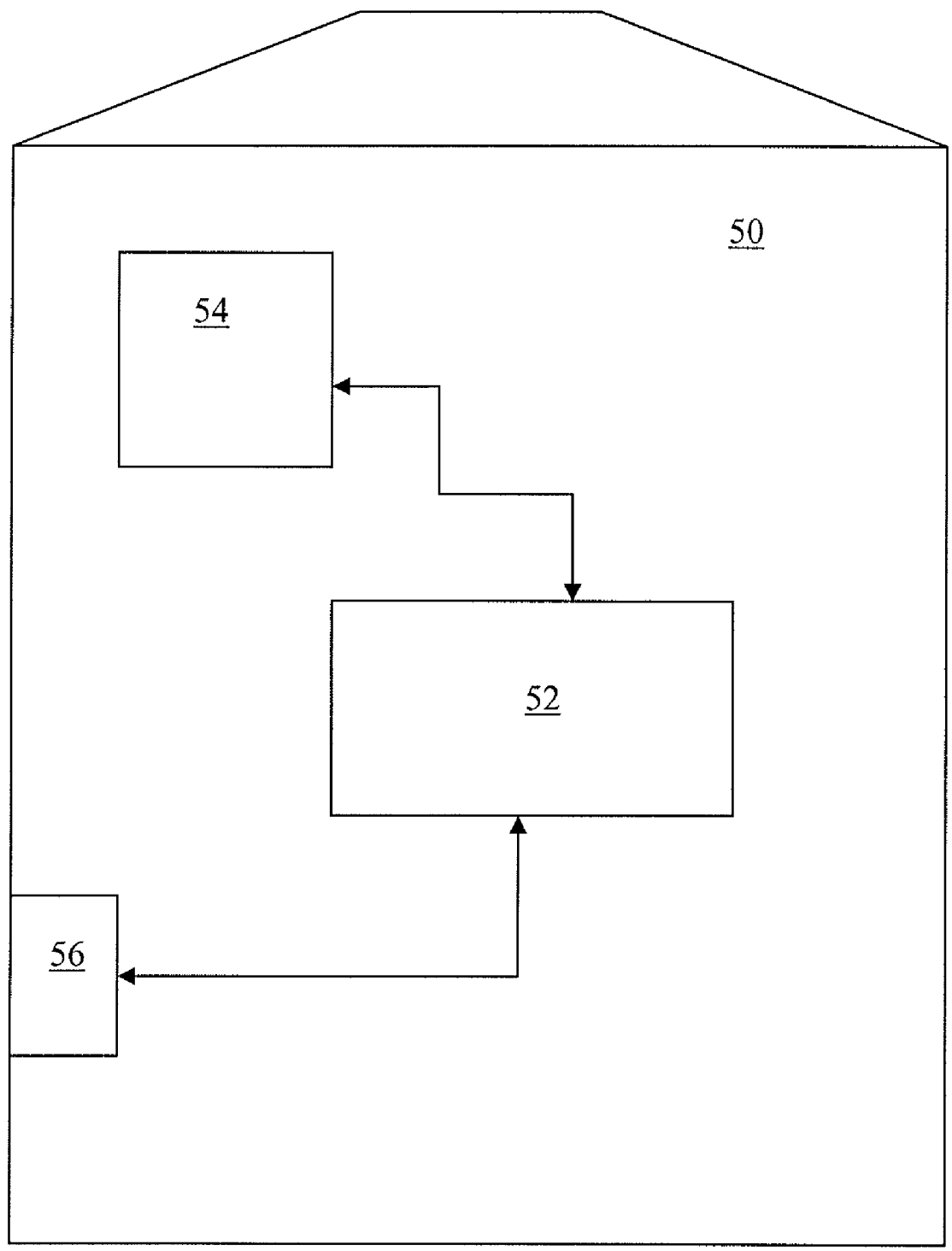
FIG. 4 shows a schematic overview of a database.

In FIG. 4, a schematic overview of a computer unit, such as a web server, database, or the like, is shown. Computer unit 50 may include a control unit 52, a memory arrangement 54, and a connecting arrangement 56. Memory unit 54 may include an application and the like, stored thereon. In an embodiment, control unit 52 may be arranged to process recorded data from a user/another computer unit or the like received via connecting arrangement 56 when an application is executed thereon.

The processed recorded data may be presented as stitched up or integrated recorded data of similar positional data but with different directional data, thereby presenting a panoramic view or a virtual reality environment placing a person surrounded by the coupled recorded data adding a three dimensional experience to a service.

Figure 5:
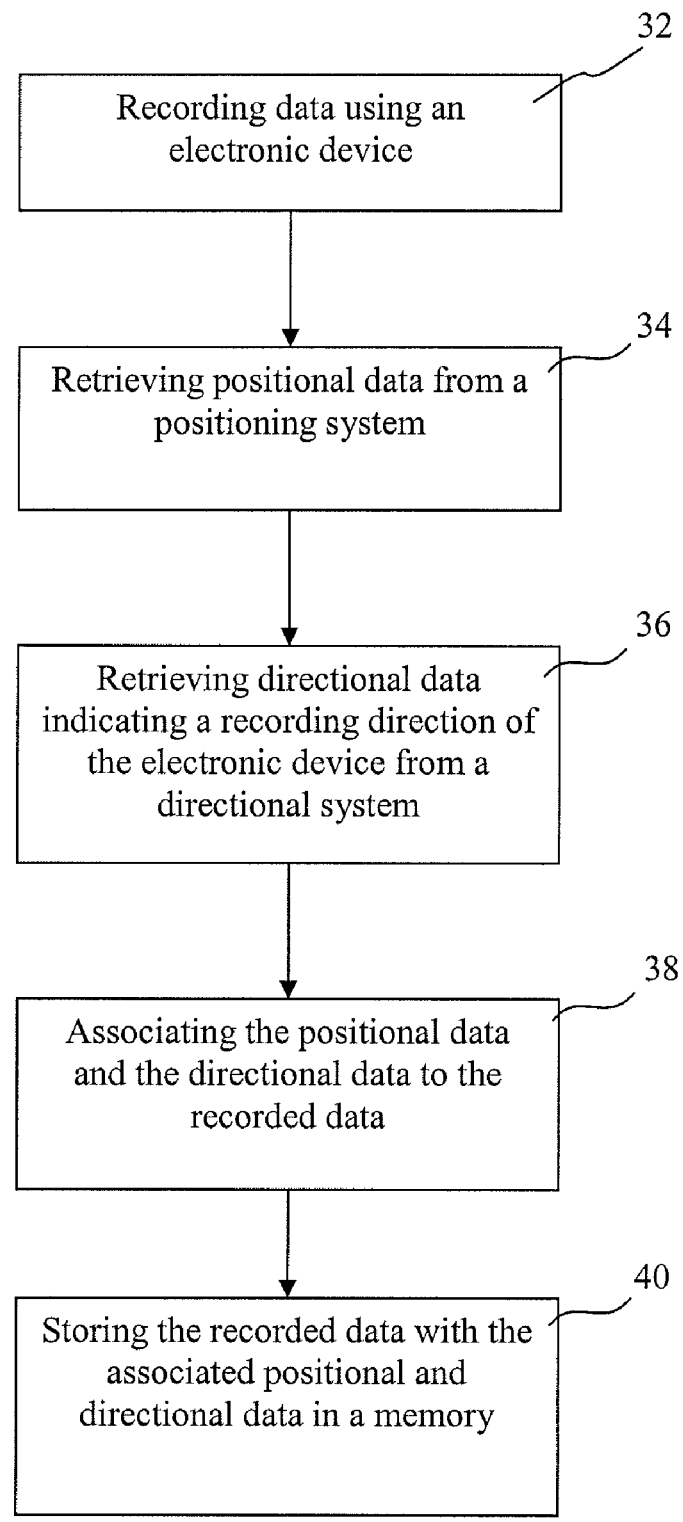
FIG. 5 shows a schematic overview of a method to process recorded data.

In FIG. 5, a method of storing recorded data tagged with geographical and directional data is shown.

In step 32, a user may record data, such as a still image, moving images, audio or the like, by using an electronic device. The electronic device may be a mobile phone or the like. The electronic device may comprise a recording unit enabled to record data in a direction. That is, the recording unit may have an input arranged to receive data from a position or a plurality of positions relative the position of the input.

In step 34, the electronic device may receive positional data indicating the position of the electronic device. The positional data may be received from a GNSS-system, such as GPS or the like. The positional data may comprise any position data, such as longitude latitude, altitude, and/or other geographical information.

In step 36, the electronic device may retrieve directional data from a directional unit, such as an electronic compass or the like. The directional data may be indicated as point of the compass plus/minus an angle (e.g., degrees, minutes, radians, etc.) or the like.

In step 38, a processor/control unit of the electronic device may associate, tag, the directional data, the positional data and/or additional data, such as date, time, tilt, pitch, roll and/or other imaging information, to the recorded data upon execution of an application thereon. An example of such a tag may be:

<Image data start>
<Time=12:04, Date: 2007-09-31, Camera Model: "SEMC Cyber shot" etc...>
<Latitude: "#value", Longitude: #value>
<Direction: "North + #°East>
<Image data end>

In step 40, the recorded data may be stored with the associated data in a memory. The memory may be a local memory of the device or an external memory of a different device. The recorded data along with its associated data tag may be transmitted to a database over a network, such as the Internet, for viewing/be presented from a web site or the like.

The recorded data may then be used in different services, such as providing images taken by users and placing them on a map or the like. When several images are used and stitched or joined together to a panoramic view, images associated with a location(s) may be viewed in a three dimensional manner.

It should also here be noted if the recorded data is audio information a user may experience a virtual surround using a surround system rendering the audio of different direction but of similar position. This feature would, for example, add the feeling of really visiting a location in a virtual environment. The audio feature may also be used in noise studies to emulate real noise levels.

An application stored locally on the electronic device may be arranged to make the control unit to connect images together only knowing the direction the camera was held and position at the time for taking the image, resulting in a substantially comprehensive panoramic view of the recorded data. With the direction added to the different images, the need to position the camera in the exact same spot is obviated. An application may compensate for the deviation of the different positions by zooming in/out of the image and cohesively stitch or aggregate the images together to produce a more accurate representation. An application may be able to stitch or assemble images together captured within, for example, 100 meters from each other depending on parameters, such as distance to objects in the recorded data, etc.

It should be noted that the application(s) may be stored and executed on a remote database as well as a home computer, a handheld electronic device or the like.

An additional feature may be to stitch or conjoin images recorded from different users together into a panoramic representation or collage. Images may be uploaded to a central server at which an application stitches them together. This combining of images may enable the feature of the showing expansive locales of the world in a three dimensional manner.

It should be noted that an application may be implemented that searches images, stored all over the Internet, from the world using positional data, directional data and/or additional data (e.g., day of the year, time of day, season, etc.), and coherently stitches them together as a composite, thereby enabling the panoramic view of different places from a certain web site, using images from other websites, as well as locally stored images.

An application may compensate images taken by different users using different electronic devices of the same object but from different positions and from different angles. One could call this step to "normalize" images to one common place, direction, time of day, day of the year, etc. For example, two captured images may be normalized to be illustrating the view from a position in between the different positions. In a similar manner, a first user that has captured a first photo may extend the recorded photo in a first direction by adding data from an image taken by a different user from a different position but of the same view, wherein the image of the different user has recorded parts of an area not recorded by the first user.

An electronic device may be tilted upward, with an angle to the ground plane, horizon, or some other reference. Implementing an arrangement detecting the tilting of the electronic device enables an application of presenting positions, locations, streets, and other landmarks in a spherical (i.e., 360°) manner. It should also be noted that the roll of the electronic device may be measured and added to the tag information.

Figure 6:
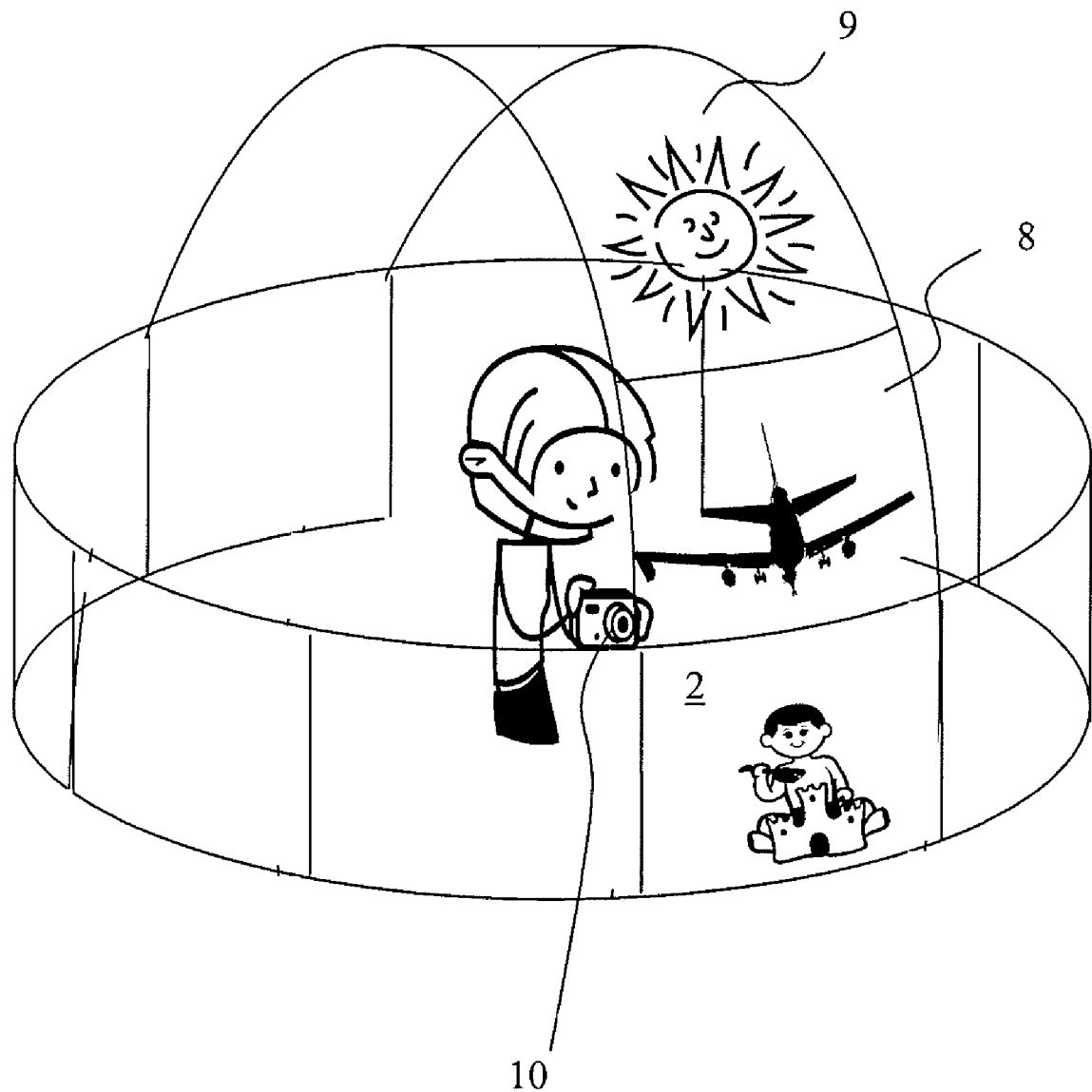
FIG. 6 shows a schematic overview of a user recording images with different tilt angles of the recording device.

Referring to FIG. 6, by implementing the feature of tagging tilt data to the recorded data, in the illustration an image, the panoramic view may also reach around and above electronic device 10 recording data. That is, electronic device 10 with the same direction, however, with different tilt angles may record different data (e.g., at different elevations), images 2, 8, and 9.

In an application, images 2, 8, and 9 may be concatenated with additional images and when presented to a user, an enhanced three dimensional virtual reality environment may be experienced by the user.

Figure 7:
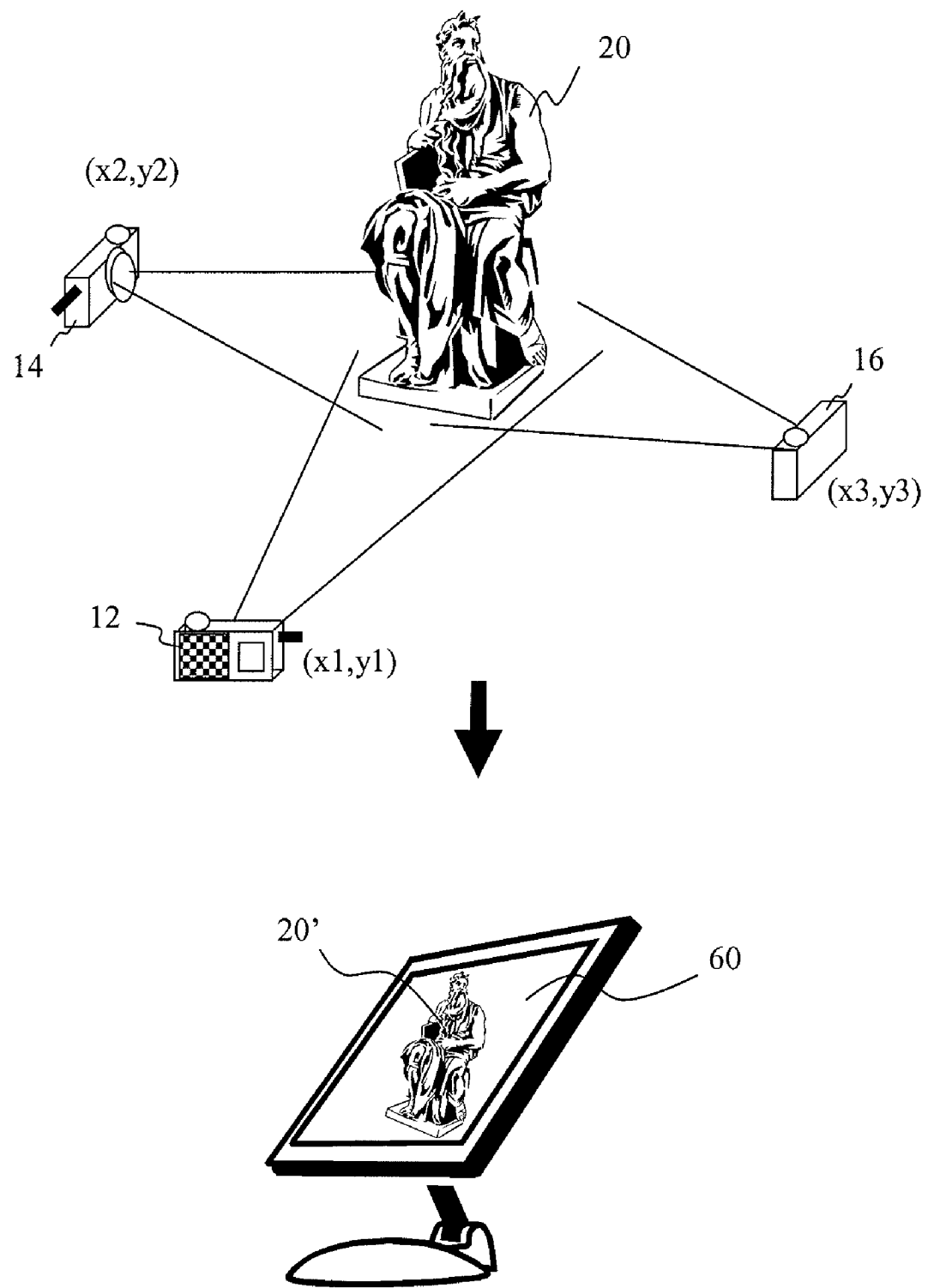
FIG. 7 shows a schematic overview of an embodiment.

In FIG. 7, an additional feature of an embodiment is shown. An embodied application function may be to create a view of an object 20, such as a statue, building, or other landmark, by retrieving/receiving images captured from different electronic devices 12, 14, 16 or a single electronic device located at different positions or frames of reference, (x1,y1); (x2,y2); (x3,y3), but directed toward the same spot or the same object 20, to thereby produce images that provide different perspectives of object 20. An application may create a three-dimensional view of an object from the recorded images directed toward the object, for example, by calculating a cross point (i.e., intersection) of the lines of view of the electronic devices. Recorded data of different positions or vantage points but aimed toward the same area, certain directions toward a certain object, may be compiled to result in an illustration of an object 20' on a screen 60 wherein the object 20' is illustrated in a three dimensional manner. The user may figuratively walk around the object viewing it from different angles.

Figure 8:
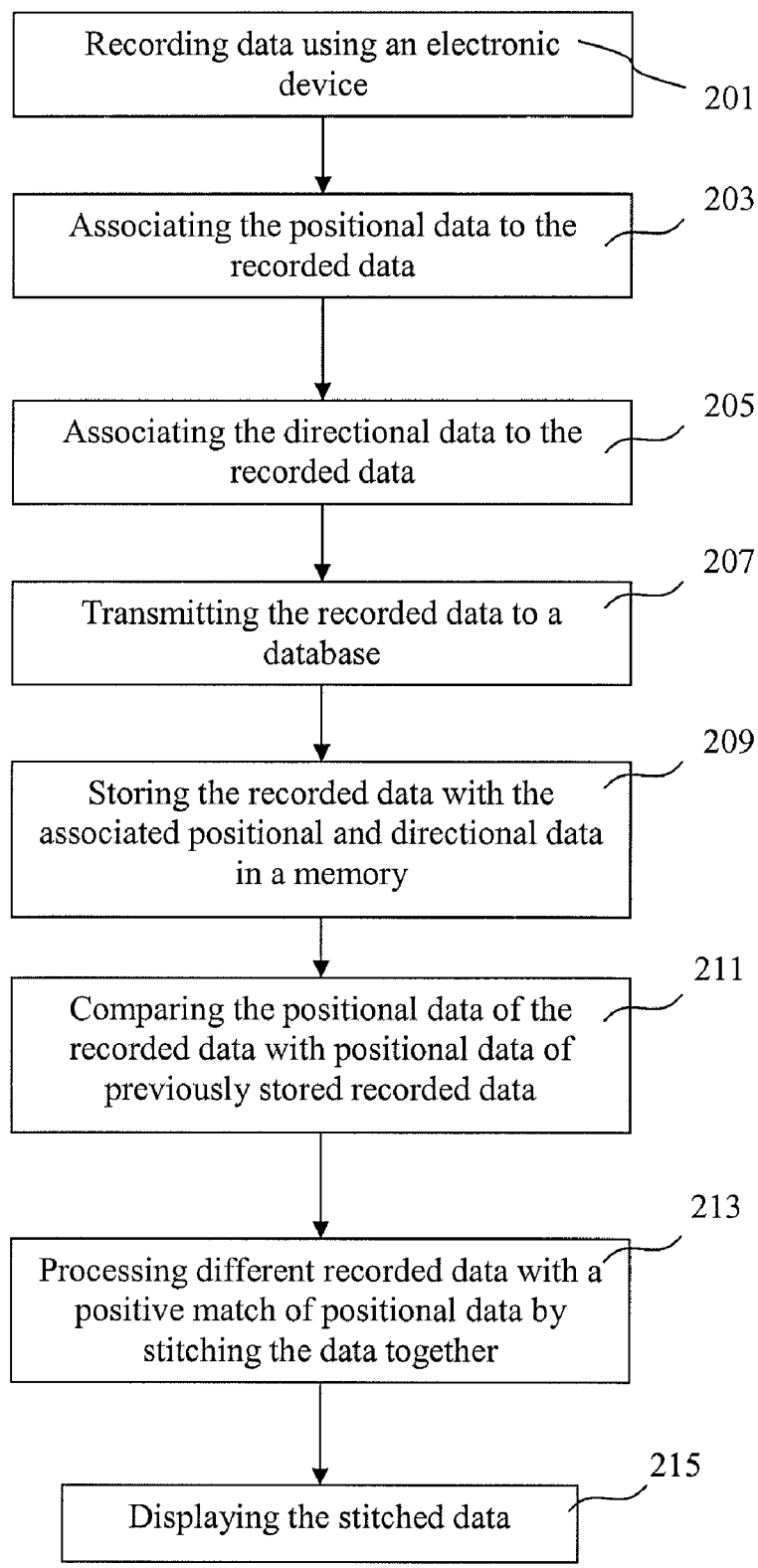
FIG. 8 shows a schematic flow chart of an embodiment.

In FIG. 8, a method is shown in an electronic device for processing recorded data including the steps of: recording data of an area (step 201); associating positional data to the recorded data (step 203); associating directional data indicating the direction to the recorded data received from a direction unit in the electronic device (step 205); optionally transmitting the recorded data with associated data to a database (step 207); storing the recorded data with the positional and directional data at a data storage (step 209); optionally comparing the positional data of the recorded data with positional data of previously stored recorded data (step 211); optionally processing different recorded data with a positive match of positional data by stitching the data together (step 213); and optionally displaying the stitched data in a service such as disclosing an experience of a user being surrounded by the stitched recorded data, a panoramic representation or the like (step 215).

The method may alternatively be preformed just in the electronic device.

A positive match between positional data is considered positional data being in a range of 50 meters of each other, for example.

The method may further include the step of associating tilting data to the recorded data from a tilting arrangement in the electronic device and that the recorded data is stored with positional, directional, and tilting data. The optional process of stitching recorded data together may further comprise to stitch data of different directional data together to form a panoramic representation and recorded data of different tilting data together to form a spherical view.

The method may further include the step of associating time of day and/or day of the year data to the recorded data from a date/time device in the electronic device and that the recorded data is stored with positional, directional, and temporal data. The optional process of stitching recorded data together may further comprise to stitch data of different directional data together to form a panoramic representation and recorded data of similar dates/times to present views of landscapes, for example, that are consistent with respect to seasonal variations in foliage, sun positioning, shadows, etc. For example, image data may be searched based on positional information and at least some temporal information (e.g., common day of year in different years, common time of day on different days, etc.), and the located images concatenated into one or more image-containing documents that are consistent with respect to temporal attributes of images.

The method may be performed using an electronic device including a recording unit arranged to record data in a direction, a positional arrangement configured to determine positional data of the electronic device, a directional arrangement arranged to determine directional data indicating the orientation of the electronic device, a memory comprising a first application stored thereon, and a control unit arranged to associate the directional data and the positional data to the recorded data upon execution of the first application.

In some embodiments the directional data indicates the direction of the recorded data relative the positional data.

In some embodiments the directional arrangement comprises an electronic compass.

In some embodiments the electronic device further comprises a tilting arrangement configured to determine a tilting angle of the electronic device, wherein the control unit is also arranged to associate the tilting angle to the recorded data.

In some embodiments the tilting arrangement comprises at least a first accelerometer.

In some embodiments the electronic device further comprises one or more temporal recording devices to associate temporal information with images that are recorded.

In some embodiments the electronic device comprises an output arrangement and wherein a second application is stored on the electronic device and the control unit is arranged to present the recorded data on the output arrangement by executing the second application.

In some embodiments the control unit is arranged to display the recorded data on the output arrangement by processing the associated directional and positional data.

Furthermore, the control unit may be arranged to store the recorded data and the associated directional and positional data and to compare the positional data of the stored recorded data with positional data of previously stored recorded data and to process the stored recorded data with the previously stored recorded data upon the positional data being similar, as the positional data being within a predetermined range of each other, by (e.g., seamlessly) integrating the recorded data with the previously stored recorded data and to display the stitched data on the output arrangement presenting a panoramic representation of the recorded data and the previously stored recorded data.

Some of the steps of the method may be performed by a computer comprising a memory with a third application stored thereon and a control unit arranged, upon execution of the third application, to receive recorded data with associated directional data and positional data, to compare positional data of previously stored, on the computer, recorded data with associated positional and directional data, to determine positional data of the recorded data to be similar as the positional data being within a predetermined range of each other, and to process the recorded data with the recorded data of similar positional data by stitching the recorded data and the previously stored recorded data together.

In some embodiments of the computer the control unit is further arranged to present the stitched data to a user as a panoramic representation of the recorded data and the previously stored recorded data.

In some embodiments of the computer the control unit is further arranged to present the stitched data to a user as a three dimensional representation of the recorded data and the previously stored recorded data.

In some embodiments of the computer the control unit is further arranged to present the stitched data based on temporal information.

Some embodiment relate to a system for presenting recorded data comprising an electronic device and a database connectable to the electronic device over a communications network, wherein the electronic device comprises a recording unit arranged to record data from a first direction, a positional arrangement configured to determine positional data of the electronic device, a directional arrangement arranged to determine directional data indicating the direction of the recorded data relative the position data, a memory comprising a first application stored thereon, and a control unit arranged to associate the directional data and the positional data to the recorded data and to transmit the recorded data with the associated positional and directional data to the database when the application is executed thereon; the database comprises a receiving arrangement configured to receive the recorded data a memory with a third application stored thereon and a database control unit arranged to execute the third application wherein the recorded data is presented based on the associated positional and directional data.

In some embodiments the database is arranged to stitch the recorded data with recorded data with associated positional and directional data previously stored thereon upon a positive match between positional data of two different data recordings.

In some embodiments a positive match is set to be positions that differ within a predetermined range.

In some embodiments a positive match is set to be positions that differ within a predetermined range of temporal information.

In some embodiments the stitched data is displayed in a virtual reality environment providing a three dimensional environment.

In some embodiments the electronic device further comprises a tilting arrangement to register the tilting angle of the recording unit relative the gravity axis of the electronic device when the image is captured.

Some embodiments relate to a computer program product including a computer usable medium having computer program logic stored therein to enable a control unit of an electronic device to perform the steps of: receiving recorded data, associating positional data of the electronic device to the recorded data, associating directional received from a directional unit in the electronic device indicating the direction of the recorded data relative the positional data, and storing the recorded data with the positional and directional data at a data storage.

In some embodiments the control unit is enabled to perform the step of associating tilting data of the electronic device wherein the recorded data is stored with the tilting data in addition to the positional and directional data.

Some embodiments relate to a computer program product including a computer usable medium having computer program logic stored therein to enable a control unit of an electronic device to perform the steps of: receiving recorded data with associated positional and directional data, comparing the positional data with positional data of previously stored on the computer device, determining positional data of the recorded data with previously stored recorded data to be similar as the positional data being within a predetermined range of each other, and processing the recorded data with the previously stored recorded data of similar positional data by stitching the data together.

In some embodiments an electronic device comprises a wireless communications device.

In some embodiments the electronic device comprises a database/server.

In some embodiments a computer program product is further configured to perform the steps of: searching recorded data on a network by using first positional data as a search term, and retrieving recorded data with positional data being in a set range of the first positional data.

In some embodiments a computer program product is further configured to perform the steps of: searching recorded data on a network by using temporal data as a search term, and retrieving recorded data with temporal data being in a set range of the temporal data.

In some embodiments the stitched recorded data and the previously stored recorded data is arranged to be displayed as a panoramic or a three dimensional representation experienced from a position.

In the drawings and specification, there have been disclosed exemplary embodiments of the invention. However, many variations and modifications can be made to these embodiments without substantially departing from the principles of the present invention.

Accordingly, although specific terms are employed, they are used in a generic and descriptive sense only and not for purposes of limitation, the scope of the invention being defined by the following claims.

What is claimed is:

1. A handheld electronic device comprising:
a recording unit to:
record images in a first direction from the handheld electronic device, and
record audio data in a second direction from the handheld electronic device, where the second direction is different than the first direction;
a positional arrangement to:
determine positional data of the handheld electronic device corresponding to the recorded images and the recorded audio data;
a directional arrangement to:
determine first directional data indicating the first direction of the handheld electronic device corresponding to the recorded images and
determine second directional data indicating the second direction of the handheld electronic device corresponding to the recorded audio data;
a tilting arrangement to:
determine a tilting angle of the handheld electronic device;
a memory to:
store a first application;
a control unit to:
execute the first application to:
associate the first directional data, the tilting angle, and the positional data with the recorded images, and
associate the second directional data and the positional data with the recorded audio data; and
store the recorded images and the recorded audio data and the associated first directional data, the associated second directional data, and the associated positional data, and
compare the positional data of the stored recorded images and the stored recorded audio data with positional data of previously stored recorded images and previously stored recorded audio data,
associate the stored recorded images and the recorded audio data with the previously stored recorded images and the previously stored recorded audio data based on comparing the positional data, where the positional data of the stored recorded images and the stored recorded audio data is within a predetermined range of the positional data of the previously stored recorded images and the previously stored recorded audio data,
stitch the stored recorded images and the stored recorded audio data with the previously stored recorded images and the previously stored recorded audio data, based on the stored recorded images and the stored recorded audio data being associated with the previously stored recorded images and the previously stored recorded audio data, and
execute a second application, stored on the handheld electronic device, to:
output the stitched images and audio data on an output arrangement to present a panoramic audio and visual representation of the stitched images and audio data, and
present the stitched images and audio data in a service disclosing an experience of a user being surrounded by the stitched images and audio data as the stitched images and audio data are presented around and above the user.

2. The electronic device of claim 1, wherein the directional data indicates the direction of the recorded images and the audio data relative to the positional data.

3. The electronic device of claim 1, wherein the directional arrangement comprises an electronic compass.

4. The electronic device according to claim 1, wherein the tilting arrangement comprises at least a first accelerometer.

5. In a handheld imaging device, a method comprising:
capturing image data of an object in a first direction from the handheld imaging device;
capturing audio data, associated with the object, in a second direction from the handheld imaging device, where the second direction is different than the first direction;
associating positional data of the handheld imaging device to the captured image data and the captured audio data;
associating directional data of the handheld imaging device indicating the direction to the object, the direction being determined at a directional unit of the handheld imaging device;
associating a tilting angle of the handheld imaging device to the captured image data;
storing the captured image data and the captured audio data together with the positional data, the tilting angle, and directional data in a memory;
associating the captured image data with the captured audio data based on the positional data; and
providing, based on the positional data, the tilting angle, and the directional data, the captured image data and the captured audio data to present a three-dimensional representation of the object, in conjunction with the audio data, in a virtual environment to a user.

6. The method of claim 5, further comprising:
associating orientation information indicating an orientation of the handheld imaging device during capturing the image data of the object, the orientation being determined at the tilting arrangement in the handheld imaging device.

7. The method of claim 5, further comprising:
comparing the positional data of the captured image data and the captured audio data to positional data of previously stored captured image data and previously stored captured audio data; and
processing different captured images and different captured audio data comprising a match of positional data by aggregating the different captured images and the different captured audio data based on comparing the positional data.

8. The method of claim 7, the match comprising positional data that differs less than 50 meters in latitude or longitude.

9. The method of claim 7, wherein the comparing and the processing are performed in the handheld imaging device.

10. The method of claim 7, wherein the comparing and the processing are performed upon receiving a command at the handheld imaging device from an external device.

11. The method of claim 7, wherein the aggregated images are presented at a display unit of the handheld imaging device.

12. A computer program product including a non-transitory computer-readable medium having computer program logic stored therein to enable a control unit of an electronic device to execute:
instructions to receive recorded image data and recorded audio data;
instructions to associate positional data of the electronic device, to the recorded image data and the recorded audio data;
instructions to associate directional data received from a directional unit in the electronic device and indicating a direction of the recorded image data and a direction of the recorded audio data relative to the positional data, to the recorded image data and the recorded audio data;
instructions to associate the recorded image data with the recorded audio data based on the positional data and the directional data associated with the recorded image data and the positional data and the directional data associated with the recorded audio data; and
instructions to store the recorded image data and the recorded audio data with the positional data and the directional data at a data storage, based on associating the recorded image data with the recorded audio data.

13. The computer program product of claim 12, further comprising:
instructions to associate tilting data of the electronic device, wherein the recorded image data and the recorded audio data is stored with the tilting data in addition to the positional data and the directional data.

\* \* \* \* \*

UNITED STATES PATENT AND TRADEMARK OFFICE
CERTIFICATE OF CORRECTION

| | | |
|---|---|---|
| PATENT NO. | : 8,174,561 B2 | Page 1 of 1 |
| APPLICATION NO. | : 12/048462 | |
| DATED | : May 8, 2012 | |
| INVENTOR(S) | : Magnus Andersson | |

It is certified that error appears in the above-identified patent and that said Letters Patent is hereby corrected as shown below:

Claim 12, column 14, line 1 should read: "instructions to associate positional data, of the electronic"
Claim 12, column 14, line 4 should read: "instructions to associate directional data, received from a"

Signed and Sealed this
Third Day of July, 2012

David J. Kappos
*Director of the United States Patent and Trademark Office*